United States Patent Office 3,644,398
Patented Feb. 22, 1972

3,644,398
1-CARBAMOYL-3-PHENYLPYRROLIDINES
Grover Cleveland Helsley, Richmond, Va., assignor to
A. H. Robins Company, Incorporated, Richmond, Va.
No Drawing. Filed Apr. 11, 1969, Ser. No. 815,496
Int. Cl. C07d 27/04
U.S. Cl. 260—326.3       7 Claims

ABSTRACT OF THE DISCLOSURE 1-carbamoyl-3-phenylpyrrolidines useful as muscle relaxants and anticonvulsants are disclosed. The compounds are prepared by reacting 3-phenylpyrrolidines with lower-alkyl isocyanates and N,N-dilower alkyl carbamoyl halides.

---

The present invention relates to certain novel heterocyclic compounds which may be referred to generally as 3-phenylpyrrolidines and is more particularly concerned with 1-(N-lower-alkyl carbamoyl) - 3 - phenylpyrrolidines and 1 - (N,N-dilower alkyl carbamoyl)-3-phenylpyrrolidines.

The compounds of the present invention may be expressed generally by the following formula:

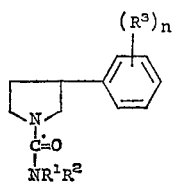

wherein:
R$^1$ is selected from hydrogen and lower-alkyl,
R$^2$ is lower alkyl,
R$^3$ is selected from hydrogen, lower alkyl, lower alkoxy, trifluoromethyl and halogen of atomic weight less than eighty, and
$n$ is a whole number less than 3.

The compounds of the invention are useful because of their pharmacological action on the central nervous system. In particular, these compounds possess activity as muscle relaxant agents and anticonvulsant agents which is demonstrated when they are tested in cats using the flexor-reflex technique of Carroll, M. N. et al., Arch. Int. Pharmacodyn. CXXX, No. 3–4, 280 (1961), at an intravenous dose of about 5–100 mg./kg. and preferably at a dose of 5–50 mg./kg. and the supramaximal electroshock seizure technique of Toman, J. E. P. et al., J. Nenurophysiol. 9, 47 (1946) at a dose level of 25–200 mg./kg. intravenously and preferably at a dose of 25–125 mg./kg. Among the compounds tested, those of Examples 1, 3 and 4, 1-methylcarbamoyl-3-(3-trifluoromethylphenyl)pyrrolidine, 1-ethylcarbamoyl-3-(3-trifluoromethylphenyl)pyrrolidine, and 1-dimethylcarbamoyl-3-(3-trifluoromethylphenyl)pyrrolidine are preferred.

It is, therefore, an object of this invention to provide novel 1-(N-lower-alkyl carbamoyl)-3-phenylpyrrolidines and 1-(N,N-dilower alkyl carbamoyl)-3 - phenylpyrrolidines useful as muscle relaxants and anticonvulsants. Another object is to provide methods for producing the novel compounds, pharmaceutical compositions containing the same, and methods for their utilization. Other objects and advantages of this invention will be apparent to one skilled in the art, and still others will become apparent hereinafter.

In the definition of symbols in Formula I and where they appear elsewhere throughout this specification the following terms shall have the following significance.

"Lower alkyl" includes straight and branched chain radicals of up to eight carbon atoms and is exemplified by such groups as methyl, ethyl, propyl, isopropyl, tertiary butyl, amyl, isoamyl, hexyl, heptyl, octyl, and the like. "Lower alkoxy" has the formula —O—lower-alkyl.

"Phenyl" includes the unsubstituted phenyl radical and phenyl radicals substituted by any radical or radicals which are not reactive or otherwise interfering under the conditions of the reaction, such as lower alkyl, trifluoromethyl, lower alkoxy and halogen having an atomic weight less than eighty. The substituted phenyl radicals have preferably no more than one to three substituents such as those given above and, furthermore, the substituents can be in various available positions of the phenyl nucleus and where more than one substituent is present can be the same or different and can be in various position combinations relative to each other. The lower-alkyl and lower alkoxy substituents each have preferably from one to three carbon atoms which can be arranged as straight or branched chains.

The starting materials for the process of the present invention are appropriately substituted 3-phenyl-3-pyrrolidinols which are prepared by methods described in United States Pat. 2,878,264. Thus, 1 - benzyl - 3 - pyrrolidinone in ether is reacted with phenylmagnesium halide. Hydrolysis of the reaction mixture with an aqueous alkaline solution such as 50 percent sodium hydroxide gives the corresponding 1-benzyl-3-phenyl-3-pyrrolidinol. The benzyl group is removed by hydrogenolysis.

The following Chart I illustrates the process of the invention and shows the various procedures involved in preparing the novel 1 - (N-lower alkyl carbamoyl)-3-phenylpyrrolidines and 1-(N,N-dilower alkyl carbamoyl)-3-phenylpyrrolidines. In Chart I, all the symbols have the values previously assigned.

CHART I

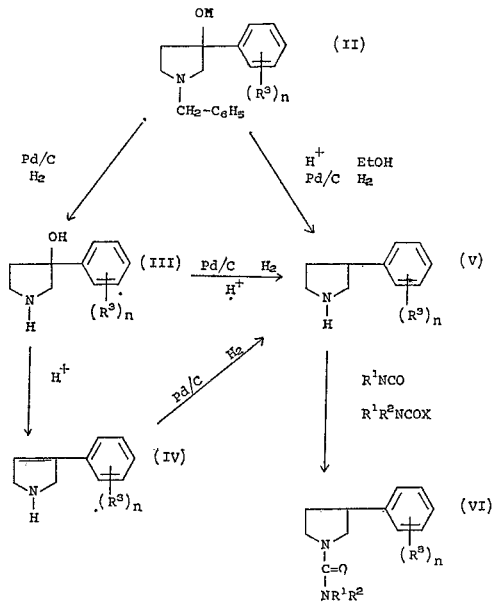

R$^1$, R$^2$, R$^3$ and $n$ have the values previously assigned and X is halogen, preferably chlorine.

As shown in Chart I, a 1-benzyl-3-phenyl-3-pyrrolidinol (II) may be converted directly to a 3-phenylpyrrolidine (V) by reduction in an acid medium in the Paar hydrogenator. The 1-benzyl-3-phenyl-3-pyrrolidinol is dissolved in absolute alcohol containing a mineral acid as, for example, hydrochloric acid, and a noble metal catalyst and the solution is shaken in one to three atmospheres of hydrogen at a temperature of from about 20° C. to about 70° C. The preferred catalyst is palladium (5–20%) on charcoal and in an amount of from about 3–10% by weight of the 1-benzyl-3-phenyl-3-pyrrolidinol. The 3-phenylpyrrolidines (V) are isolated from the cooled reaction mixture and purified by distillation or by conversion to an acid addition salt.

When a mineral acid is omitted from the reaction mixture, the 1-benzyl-3-phenyl-3-pyrrolidinols are catalytically debenzylated to 3-phenyl-3-pyrrolidinols (III). Subsequent dehydration and reduction to 3-phenylpyrrolidines (V) is achieved by hydrogenolysis in an acid medium using similar conditions to those given hereinabove.

Another aspect of the present invention is shown in Chart I, wherein a 3-phenyl-3-pyrrolidinol (III) intermediate may be dehydrated by refluxing in a concentrated mineral acid as, for example, hydrochloric acid, for a period of from about ten to about twenty hours, to give 3-phenyl-3-pyrrolines (IV). The 3-phenyl-3-pyrrolines may be catalytically reduced in the Paar hydrogenator using the procedure given hereinabove to give 3-phenylpyrrolidines of Formula V.

Starting materials such as the 3-(halosubstitutedphenyl) pyrrolidines are preferably prepared by lithium aluminum hydride reduction of an appropriately substituted α-phenylsuccinimide according to methods described by Welstead et al., J. Med. Chem., 10: 1015 (1967). The α-halosubstituted-phenylsuccinimides are obtained by the synthetic methods described by C. A. Miller et al., J.A.C.S. 73: 4895 and 5610 (1951).

The novel 1-(N-lower alkyl carbamoyl)-3-phenylpyrrolidines and 1-(N,N-dilower alkyl carbamoyl)-3-phenylpyrrolidines which are more fully disclosed hereinafter are prepared from the 3-phenylpyrrolidine intermediates obtained as described above by reacting them with lower alkyl isocyanates and N,N-dilower alkyl carbamoyl halides. The reactions are generally run at or about room temperature in dry non-reactive organic solvents as, for example, benzene, toluene, xylene, ethanol and chloroform. When a 3-phenylpyrrolidine is reacted with a disubstituted carbamoyl halide, an acid binding agent as, for example, sodium or potassium carbonate is generally used. The 1-carbamoyl-3-phenylpyrrolidines thus formed are usually isolated from the reaction mixture by filtration and evaporation of the solvent. The residual oil is purified by distillation or crystallization from a suitable solvent system.

Other novel compounds corresponding to Formula I may be prepared by treating 3-phenylpyrrolidines with phosgene. The reaction is carried out under anhydrous conditions in an inert solvent such as toluene or benzene and in the presence of an acid acceptor such as triethylamine. The thus formed 1-chlorocarbonyl-3-phenylpyrrolidines are then reacted with amines such as methyl amine, ethylamine, dimethylamine, and the like, to give novel compounds of Formula I. The reaction is usually run in a solvent mixture such as methylene chloride-ether or benzene at ambient to reflux temperature of the solvent used and in the presence of an acid acceptor such as pyridine. The products are isolated and purified by crystallization from a suitable solvent or column chromatography.

The following preparations and examples are given by way of illustration only and are in no event to be construed as limiting.

PREPARATION I

3-phenylpyrrolidine oxalate

A mixture of 62.6 g. (0.25 mole) of 1-benzyl-3-phenyl-3-pyrrolidinol, 100 ml. of concentrated hydrochloric acid and 200 ml. of absolute ethanol containing 10 g. of 10% palladium-on-charcoal catalyst was shaken in a hydrogen atmosphere at 70° C. until two equivalents of hydrogen were absorbed (6 hours). The cooled suspension was filtered and concentrated. The residual oil was basified with 50% sodium hydroxide solution and extracted with benzene. The combined benzene extracts were washed with water, dried over magnesium sulfate and the solvent evaporated. The oil was distilled at reduced pressure and the fraction boiling at 126–128° C./20 mm. was collected. The colorless, non-viscous oil which weighed 17.5 g. (48% yield) was dissolved in isopropanol and converted to the oxalate salt which melted at 135.5–138° C.

*Analysis.*—Calculated for $C_{12}H_{15}NO_4$ (percent): C, 60.74; H, 6.37; N, 5.91. Found (percent): C, 60.73; H, 6.28; N, 5.81.

Utilizing the procedure of Preparation I, the following starting materials are prepared:

3 - (4 - methoxyphenyl)pyrrolidine.—1-benzyl - 3 - (4-methoxyphenyl)-3-pyrrolidinol dissolved in concentrated hydrochloric acid and absolute ethanol is catalytically debenzylated, dehydrated and reduced to give 3-(4-methoxyphenyl)pyrrolidine.

3-(3-fluorophenyl)pyrrolidine.—1-benzyl - 3 - (3-fluorophenyl)-3-pyrrolidinol is catalytically debenzylated, dehydrated and reduced in the Paar hydrogenator to give 3-(3-fluorophenyl)pyrrolidine.

3-(2,4-dimethylphenyl)pyrrolidine.—1-benzyl - 3 -(3,4-dimethylphenyl)-3-pyrrolidinol is catalytically debenzylated, dehydrated and reduced in the Paar hydrogenator to give 3-(2,4-dimethylphenyl)pyrrolidine.

PREPARATION II

3-(3-trifluoromethylphenyl)-3-pyrrolidinol

A solution of 16.1 g. (0.05 mole) of 1-benzyl-3-(3-trifluoromethylphenyl)-3-pyrrolidinol in 200 ml. of ethanol containing 5 g. of 10% palladium-on-charcoal catalyst was shaken in a hydrogen atmosphere at 70° C. until one equivalent of hydrogen was absorbed. The cooled suspension was filtered and concentrated. The residual oil which crystallized on cooling was recrystallized from a benzene-isooctane mixture. The white compound melted at 84.5–87° C. and weighed 8.1 g. (70% yield).

*Analysis.*—Calculated for $C_{11}H_{12}F_3NO$ (percent): C, 57.14; H, 5.23; N, 6.06. Found (percent): C, 57.05; H, 5.07; N, 6.19.

PREPARATION III

3-(3-trifluoromethylphenyl)pyrrolidine hydrochloride

A solution of 11.5 g. (0.05 mole) of 3-(3-trifluoromethylphenyl)-3-pyrrolidinol in 200 ml. of 6 N hydrochloric acid containing 4 g. of 10% palladium-on-charcoal catalyst was shaken in a hydrogen atmosphere at 70° C. until one equivalent of hydrogen was absorbed. The cooled suspension was filtered and the filtrate was basified with 50% sodium hydroxide solution. The oil which separated was extracted with ether, the combined ether extracts were washed with water, dried over magnesium sulfate and the solvent was evaporated. The non-viscous residual oil which weighed 7.1 g. (65% yield) was converted to the hydrochloride salt which was crystallized from isopropanol-isopropyl ether and melted at 111–113° C.

*Analysis.*—Calculated for $C_{11}H_{13}ClNF_3$ (percent): C, 52.49; H, 5.21; N, 5.57. Found (percent): C, 52.34; H, 5.28; N, 5.54.

PREPARATION IV

3-(3-trifluoromethylphenyl)-3-pyrroline hydrochloride

A solution of 30 g. of 3-(3-trifluoromethylphenyl)-3-pyrrolidinol in 50 ml. of concentrated hydrochloric acid was refluxed 16 hours. The crystalline product which separated on cooling was separated by filtration, dried, and recrystallized from an isopropyl ether-isopropanol mixture. The white product weighed 14.1 g. (51% yield) and melted at 214–216° C.

*Analysis.*—Calculated for $C_{11}H_{11}ClF_3N$ (percent): C, 52.92; H, 4.44; N, 5.61. Found (percent): C, 53.04; H, 4.46; N, 5.62.

EXAMPLE 1

1-methylcarbamoyl-3-(3-trifluoromethylphenyl) pyrrolidine

To a stirred solution of 2.0 g. (0.01 mole) of 3-(3-trifluoromethylphenyl)pyrrolidine in 75 ml. of dry benzene was added slowly a solution of 0.6 g. (0.01 mole) of methylisocyanate in 25 ml. of dry benzene. The reaction mixture was stirred at room temperature one hour and the solvent was evaporated at reduced pressure. The oil which crystallized on trituration with an isooctane-isopropyl ether mixture was recrystallized from the same solvent system. The product weighed 1.9 g. (71%) and melted at 89–91° C.

*Analysis.*—Calculated for $C_{13}H_{15}F_3N_2O$ (percent): C, 57.35; H, 5.55; N, 10.29. Found (percent): C, 57.30; H, 5.56; N, 10.21.

EXAMPLE 2

1-ethylcarbamoyl-3-(3-trifluoromethylphenyl)pyrrolidine

To a stirred solution of 1.0 g. (0.0047 mole) of 3-(3-trifluoromethylphenyl)pyrrolidine in 125 ml. of dry benzene was added slowly a solution of 0.33 g. (0.0047 mole) of ethylisocyanate in 25 ml. of dry benzene. The mixture was stirred at room temperature one hour and the solvent was evaporated at reduced pressure. The oil which crystallized on cooling was recrystallized from an isooctane-isopropyl ether mixture yielding 0.6 g. (45%) of product melting at 96–96.5° C.

*Analysis.*—Calculated for $C_{14}H_{17}F_3N_2O$ (percent): C, 58.73; H, 5.99; N, 9.78. Found (percent): C, 58.93; H, 6.13; N, 9.81.

EXAMPLE 3

1-(n-butylcarbamoyl)-3-(3-trifluoromethylphenyl) pyrrolidine

To a stirred solution of 2.0 g. (0.09 mole) of 3-(3-trifluoromethylphenyl)pyrrolidine in 75 ml. of dry benzene was added slowly a solution of 1.0 g. (0.01 mole) of n-butyl isocyanate in 25 ml. of dry benzene. The reaction mixture was stirred at room temperature one hour and the solvent was evaporated at reduced pressure. The crude residual oil was dissolved in benzene and washed successively with 3 N hydrochloric acid, 10% sodium bicarbonate and water. The benzene fraction was dried over magnesium sulfate and the solvent was evaporated. The product weighed 2.4 g. (83% yield).

*Analysis.*—Calculated for $C_{16}H_{21}F_3N_2O$ (percent): C, 61.14; H, 6.73; N, 8.91. Found (percent): C, 61.44; H, 6.96; N, 8.65.

EXAMPLE 4

1-Dimethylcarbamoyl-3-(3-trifluoromethylphenyl) pyrrolidine

A stirred mixture of 6.5 g. (0.03 mole) of 3-(3-trifluoromethylphenyl)pyrrolidine, 3.3 g. (0.032 mole) of dimethylcarbamylchloride, 12 g. of potassium carbonate and 100 ml. of dry benzene was stirred at room temperature 16 hours and refluxed one hour, cooled and filtered. The solvent was evaporated, the residual oil was distilled at reduced pressure, and the fraction boiling at 118–120° C./.03 mm. was collected. The colorless oil weighed 4.8 g. (56% yield).

*Analysis.*—Calculated for $C_{14}H_{17}F_3N_2O$ (percent): C, 58.74; H, 5.99; N, 9.79. Found (percent): C, 58.65; H, 5.96; N, 9.73.

EXAMPLE 5

1-Isopropylcarbamoyl-3-(3-trifluoromethylphenyl) pyrrolidine

To a stirred solution of 3.0 g. (0.014 mole) of 3-(3-trifluoromethylphenyl)pyrrolidine in 75 ml. of dry benzene was added slowly a solution of 1.3 g. (0.015 mole) of isopropyl isocyanate in 25 ml. of dry benzene. The reaction mixture was stirred at room temperature one hour and the solvent was evaporated at reduced pressure. The residual oil which crystallized on trituration with isooctane was recrystallized from an isooctane-benzene mixture. The white product weighed 3.2 g. (77% yield) and melted at 112–115° C.

*Analysis.*—Calculated for $C_{15}H_{19}F_3N_2O$ (percent): C, 59.99; H, 6.38; N, 9.33. Found (percent): C, 59.81; H, 6.33; N, 9.28.

EXAMPLE 6

1-Propylcarbamoyl-3-(3-trifluoromethylphenyl) pyrrolidine

To a stirred solution of 5.0 g. (0.023 mole) of 3-(3-trifluoromethylphenyl)pyrrolidine in 75 ml. of dry benzene was added slowly a solution of 2.0 g. (.023 mole) of propyl isocyanate in 25 ml. of dry benzene. The reaction mixture was stirred one hour at room temperature and the solvent was evaporated in vacuo. The residual oil was crystallized from isooctane-isopropyl ether to give 5.3 g. (95% yield) of product which melted at 76.5–78.5° C.

*Analysis.*—Calculated for $C_{15}H_{19}N_2OF_3$ (percent): C, 59.99; H, 6.38; N, 9.27. Found (percent): C, 60.21; H, 6.50; N, 9.27.

Utilizing the procedures of Examples 1–6, the following compounds are prepared from the stated ingredients:

1 - ethylcarbamoyl - 3 - phenylpyrrolidine is prepared by reacting 3-phenylpyrrolidine and ethyl isocyanate.

1 - ethylcarbamoyl - 3 - (4-methoxyphenyl)pyrrolidine is prepared by reacting 3-(4-methoxyphenyl)pyrrolidine and ethyl isocyanate.

1 - ethylcarbamoyl - 3 - (2,4-dimethylphenyl)pyrrolidine is prepared by reacting 3-(2,4-dimethylphenyl)pyrrolidine and ethyl isocyanate.

1 - pentylcarbamoyl - 3 - (3-fluorophenyl)pyrrolidine is prepared by reacting 3-(3-fluorophenyl)pyrrolidine and pentyl isocyanate.

1 - dimethylcarbamoyl - 3 - (2,4-dimethylphenyl)pyrrolidine is prepared by reacting 3-(2,4-dimethylphenyl)pyrrolidine and dimethylcarbamoyl chloride.

1 - methylcarbamoyl - 3 - (4-chlorophenyl)pyrrolidine is prepared by reacting 3-(4-chlorophenyl)pyrrolidine and methylisocyanate.

1 - dimethylcarbamoyl - 3 - phenylpyrrolidine is prepared by reacting 3-phenylpyrrolidine and dimethylcarbamoyl chloride.

1 - diethylcarbamoyl - 3 - phenylpyrrolidine is prepared by reacting 3-phenylpyrrolidine and diethylcarbamoyl chloride.

1 - ethylcarbamoyl - 3 - (3-chlorophenyl)pyrrolidine is prepared by reacting 3-(3-chlorophenyl)pyrrolidine and ethyl isocyanate.

1 - methylcarbamoyl - 3 - (4-bromophenyl)pyrrolidine is prepared by reacting 3-(4-bromophenyl)pyrrolidine and methyl isocyanate.

Formulation and administration

Useful compositions containing at least one of the compounds according to the invention in association with a pharmaceutical carrier or excipient may be prepared in accordance with conventional technology and procedures. Thus, the compounds may be presented in a form suitable for oral or parenteral administration. For example, compositions for oral administration can be solid or liquid and can take the form of capsules, tablets, coated tablets and suspensions, such compositions comprising carriers or excipients conveniently used in the pharmaceutical art. Suitable tableting excipients include lactose, potato, and maize starches, talc, gelatin, and stearic, and silicic acids, magnesium stearate, and polyvinyl pyrrolidone.

For parenteral administration the carrier or excipient may be a sterile, parenterally acceptable liquid; e.g., water or a parenterally acceptable oil; e.g. arachis oil contained in ampules.

Advantageously, the compositions may be formulated as dosage units, each unit being adapted to supply a fixed dose of active ingredients. Tablets, capsules, coated tablets and ampules are examples of preferred dosage unit forms according to the invention.

Although small quantities of the active materials of the present invention are effective when minor therapy is involved or in cases of administration to subjects having a relatively low body weight, unit dosages are usually five milligrams or above and preferably twenty-five, fifty or one hundred milligrams or even higher, depending of course upon the emergency of the situation and the particular result desired. Five to fifty milligrams appear to be optimum per unit dose, while usual broader ranges appear to be one to 500 milligrams per unit dose. It is only necessary that the active ingredient constitute an effective amount, i.e., such that a suitable effective dosage will be obtained consistent with the dosage form employed. Obviously, several unit dosage forms may be administered at about the same time.

The following are examples of compositions formed in accordance with this invention.

(1) Capsules.—Capsules of 5, 25, and 50 mg. of active ingredient per capsule are prepared. With the higher amounts of active ingredient, reduction may be made in the amount of lactose.

Typical blend for encapsulation:  Per capsule, mg.
Active ingredient _____ 5.0
Lactose _____ 296.7
Starch _____ 129.0
Magnesium stearate _____ 4.3

Total _____ 435.0

(2) Tablets.—A typical formulation for a tablet containing 5 mg. of active ingredient per tablet follows. The formulation may be used for other strengths of active ingredient by adjustment of weight of dicalcium phosphate.

Per tablet, mg.
(1) Active ingredient _____ 5.0
(2) Corn starch _____ 13.6
(3) Corn starch (paste) _____ 3.4
(4) Lactose _____ 79.2
(5) Dicalcium phosphate _____ 68.2
(6) Calcium stearate _____ 0.9

Total _____ 170.3

Uniformly blend 1, 2, 4, and 5. Prepare 3 as a ten percent paste in water. Granulate the blend with starch paste and pass the wet mass through an eight-mesh screen. The wet granulation is dried and sized through a twelve-mesh screen. The dried granules are blended with the calcium stearate and compressed.

Additional tablet formulations preferably contain a higher dosage of the active ingredient and are as follows:

50 mg. tablet, ingredients:  Per tablet, mg.
Active ingredient _____ 50.0
Lactose _____ 90.0
Milo starch _____ 20.0
Calcium stearate _____ 2.0
Corn starch _____ 38.0

Total _____ 200.0

Uniformly blend the active ingredient, lactose, starches, and dicalcium phosphate when present. The blend is then granulated using water as a granulating medium. The wet granules are passed through an eight-mesh screen and dried at 140–160° Fahrenheit overnight. The dried granules are passed through a ten-mesh screen, blended with the proper amount of calcium stearate, and the lubricated granules then converted into tablets on a suitable tablet press.

(3) Injectable—2% sterile solution:     Per cc.
Active ingredient _____ 20 mg.
Preservative, e.g., chlorobutanol ___ 0.5% weight/volume.
Water for injection, q.s.

Prepare solution, clarify by filtration, fill into vials, seal, and autoclave.

Various modifications in the compounds, compositions and methods of the invention will be apparent to one skilled in the art and may be made without departing from the spirit or scope thereof, and it is therefore to be understood that the invention is to be limited only by the scope of the appended claims.

What is claimed:

1. A compound selected from the group consisting of a member having the formula:

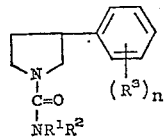

wherein:
$R^1$ is selected from the group consisting of hydrogen and lower alkyl,
$R^2$ is lower alkyl,
$R^3$ is selected from the group consisting of hydrogen, lower alkyl, lower alkoxy, trifluoromethyl and halogen of atomic weight less than eighty, and
$n$ is a whole number less than 3.

2. A compound as defined in claim 1 which is 1-methylcarbamoyl-3-(3-trifluoromethylphenyl)pyrrolidine.

3. A compound as defined in claim 1 which is 1-ethylcarbamoyl-3-(3-trifluoromethylphenyl)pyrrolidine.

4. A compound as defined in claim 1 which is 1-dimethylcarbamoyl-3-(3-trifluoromethylphenyl)pyrrolidine.

5. A compound as defined in claim 1 which is 1-(n-butylcarbamoyl)-3-(3-trifluoromethylphenyl)pyrrolidine.

6. A compound as defined in claim 1 which is 1-propylcarbamoyl-3-(3-trifluoromethylphenyl)pyrrolidine.

7. A compound as defined in claim 1 which is 1-isopropylcarbamoyl-3-(3-trifluoromethylphenyl)pyrrolidine.

References Cited

Wagner et al.: Synthetic Organic Chemistry (1953), pp. 645–647.

ALEX MAZEL, Primary Examiner

J. A. NARCAVAGE, Assistant Examiner

U.S. Cl. X.R.

260—326.5 R, 326.5 M, 326.8; 424—274